J. A. LAKIN.
Overdraw-Check.
No. 8,553. Reissued Jan. 28, 1879.
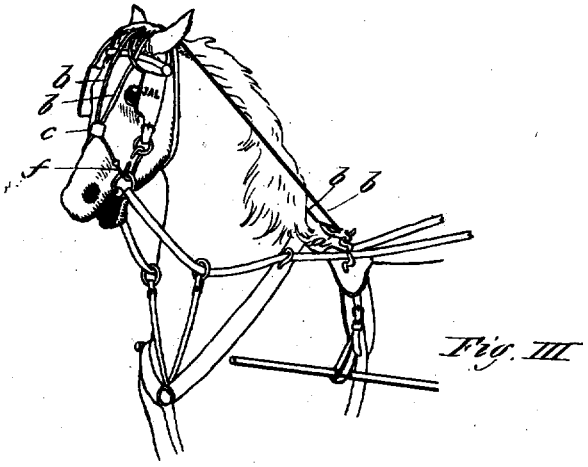
Fig. III
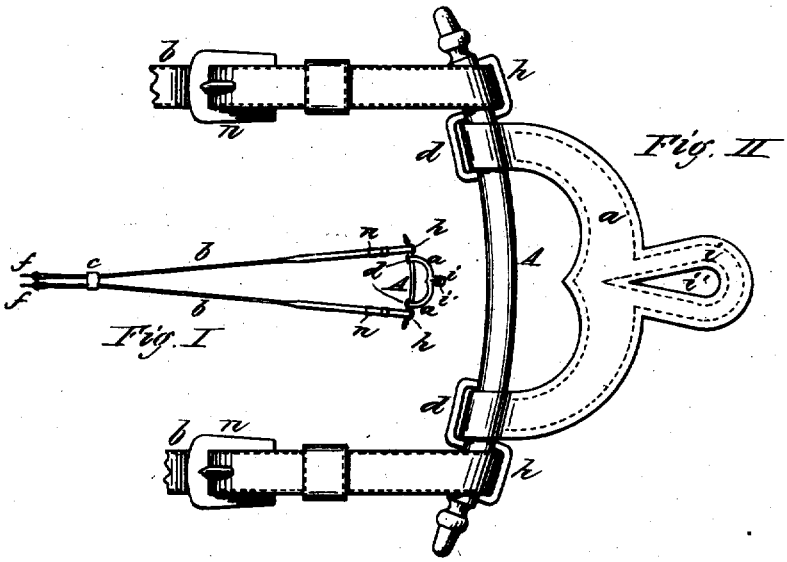
Fig. I
Fig. II
Witnesses.
C. E. Buckland.
Fred E. Burtis.
Inventor:
James A. Lakin
By T. A. Curtis,
his Atty.
N. PETERS, PHOTO-LITHOGRAPHER, WASHINGTON, D. C.

UNITED STATES PATENT OFFICE.

JAMES A. LAKIN, OF WESTFIELD, MASSACHUSETTS.

IMPROVEMENT IN OVERDRAW-CHECKS.

Specification forming part of Letters Patent No. 148,307, dated March 10, 1874; Reissue No. 8,553, dated January 28, 1879; application filed December 21, 1878.

*To all whom it may concern:*

Be it known that I, JAMES A. LAKIN, of Westfield, in the State of Massachusetts, have invented a new and useful Improvement in Overdraw-Checks; and that the following is a full, clear, and exact description thereof, reference being had to the accompanying drawings, making a part of this specification, and to the letters of reference marked thereon.

My invention relates to overdraw-checks for horses; and it consists of a bar having a piece attached thereto, with a hole therein, or with a hook or other fastening secured thereto, by means of which the bar is attached to the water-hook of the saddle, and having loops, one at each end, to secure two parallel straps in place, which are attached to the bar, and extend forward and are attached to the bit-ring of the bridle, as will be more fully hereinafter described.

Figure I is a plan view of my invention. Fig. II is a plan view, enlarged, of the bar and its fastening, and showing the ends of the straps attached thereto; and Fig. III is a sketch showing its adaptation and attachment to a harness.

In the drawings, A is a bar, made preferably of metal, and provided at each end with a loop, *h*, which serves to prevent the straps *b* from slipping off the bar when they are attached in place.

A piece, *a*, is attached to the bar, by stitching or otherwise, and this piece, for the sake of lightness and to save stock, may be bifurcated, with each end passed through a loop or clasp, *d*, and properly secured; and this piece *a* is provided with a loop, *i*, having a hole, *i'*, therein, by means of which it is secured to the water-hook of the saddle; or, instead of the hole *i'*, a hook or other fastening may be secured to the piece *a*, as a means of attaching the bar to the water-hook.

The straps *b b* are provided at one end with suitable hooks or buckles *f*, by means of which they are attached to the bit-ring of the bridle, and said straps extend parallel with each other to a suitable length, passing through a loop, *c*, and the other end of each strap is attached to the bar A, near the end, and inside the loop *h*, to keep the strap in place on the bar; and each strap may be lengthened or shortened by means of the buckle *n*.

The operation of my invention is as follows: The hook *f*, at one end of each strap *b*, is attached to the bit, and if the horse is inclined to hold his head down and toward his breast, the loop *c* is slipped down somewhat low and near to the bit, as shown in Fig. III; but if the horse is inclined to throw his nose forward, the loop may be moved farther up. After the straps leave the loop *c* they are held apart by each passing through a loop on the head-piece of the bridle, near each ear, and from thence the straps extend back, one upon each side the neck of the horse, and their rear ends are attached to the bar A, which is attached to the water-hook of the saddle.

In the ordinary construction of the overdraw-check a single strap is used, which is split at the end, to attach to each ring of the bit, and passes over the horse's head as a single strap, and is split again and attached to the water-hook, without any bar A. By this arrangement, as the horse turns his head to either side the strap cuts and wears off his mane, so much so that oftentimes the mane is completely ruined; and the straps being connected and rigid, as the horse turns his head the strap draws hard upon one side of his mouth, and often makes it sore.

It is the object of the bar overdraw-check to obviate the above-mentioned objections, which it accomplishes perfectly, as, the straps being separate, the bar A, being secured to the water-hook, turns thereon as upon a pivot, and allows the horse a free movement of his head to either side, without any undue pulling or strain upon his mouth, and the straps *b* are held away from his mane, preventing it from being cut and worn away.

The piece *a* may be of metal, and of any suitable form, to be used as a means of attaching the bar A to the water-hook.

Having thus described my invention, what I claim as new is—

1. The combination, in a check, of the bar A, provided with loops *h*, one at either end, and adapted to be attached or pivoted to the water-hook of the saddle, and the check-straps *b*, attached to the ends of said bar and to the bit of the bridle, substantially as and for the purpose described.

2. In a check for harnesses, the bar A, provided with loops *h*, one at either end, to keep the check-straps in place, and provided with the piece *a*, to pivot it to the water-hook of the saddle, substantially as and for the purpose set forth.

JAMES A. LAKIN.

Witnesses:
T. A. CURTIS,
C. E. BUCKLAND.